Front & rear components axially adjustable for focusing, intermediate components radially adjustable during such focusing
W. W. BLACKMAN.
LENS MOUNT FOR PHOTOGRAPHIC AND PROJECTING APPARATUS.
APPLICATION FILED APR. 21, 1919.
1,325,314.
Patented Dec. 16, 1919.
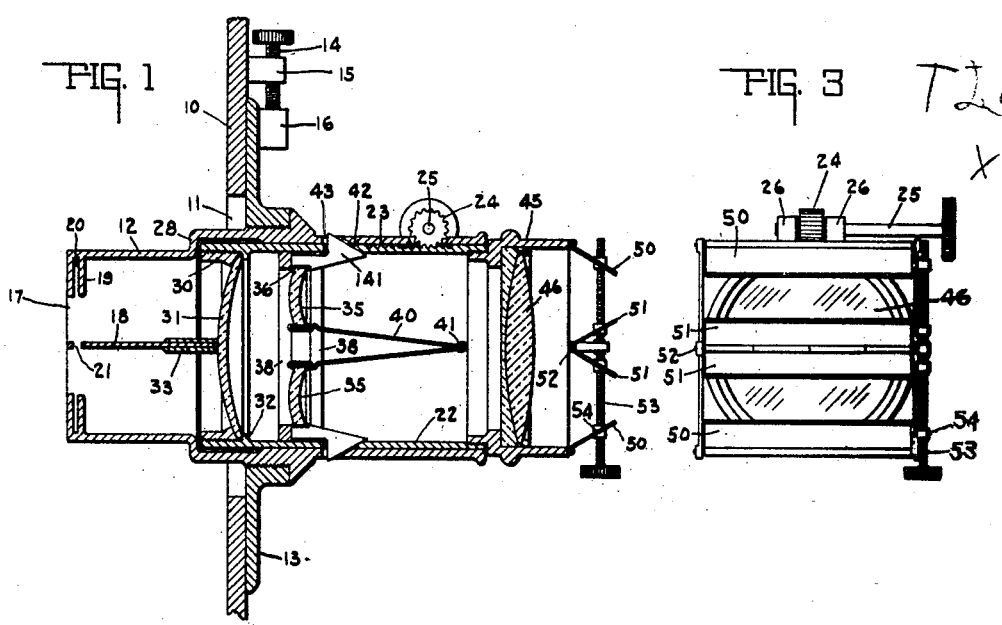
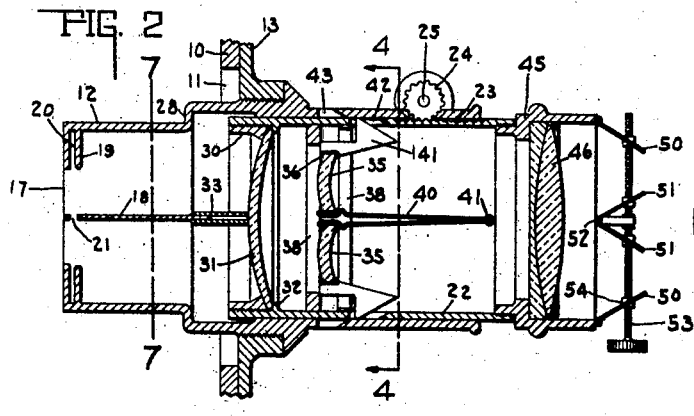
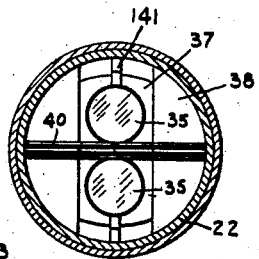
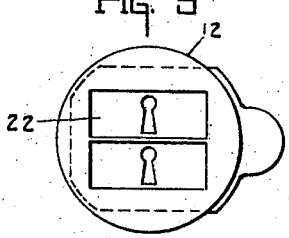
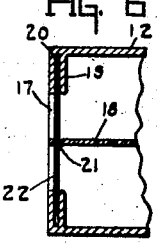
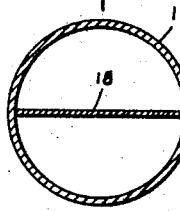
INVENTOR.
WALTER W. BLACKMAN.
BY
ATTORNEYS.

UNITED STATES PATENT OFFICE.

WALTER W. BLACKMAN, OF INDIANAPOLIS, INDIANA.

LENS-MOUNT FOR PHOTOGRAPHIC AND PROJECTING APPARATUS.

1,325,314.     Specification of Letters Patent.     Patented Dec. 16, 1919.

Application filed April 21, 1919. Serial No. 291,664.

*To all whom it may concern:*

Be it known that I, WALTER W. BLACKMAN, a citizen of the United States, and a resident of 19 North Alabama street, Indianapolis, county of Marion, and State of Indiana, have invented a certain new and useful Lens-Mount for Photographic and Projecting Apparatus; and I do hereby declare that the following is a full, clear, and exact description thereof, reference being had to the accompanying drawings, in which like numerals refer to like parts.

This invention relates to an improved lens mount for photographic and projecting apparatus, whereby a camera can produce a plurality of images and a projecting machine can project a plurality of images upon a common field. The construction and operation thereof are such that the focal arrangement is rendered extremely simple and that it is adapted for use in common cameras and projecting machines.

One feature of the invention consists in means for the ready adjustment to adapt a camera to variable distances of the object being photographed, or adapt a projecting machine for variable distances from the screen. Thus the plane passing through the optical axes of the lenses are corrected so that the duplication of images will fall directly within their proper relative position in the apertures.

Another feature of the invention consists in simple and convenient means for adjusting the lens mount so as to cause the apertures to register accurately with the frame lines of the pictures or images.

Another feature of the invention is to provide means for the simultaneous adjustment of the front and intermediate objectives.

Another feature of the invention consists in providing an automatic connection of the back objective with the partition between the two aperture chambers as the last objectives are adjusted.

Another feature of the invention consists in an adjustable diaphragm construction in front of the front objective wherein the diaphragms are longitudinal and parallel with each other instead of round or curved.

The lens mount disclosed herein is constructed for the purpose of photographing a single subject in duplication of images at one and the same exposure and for maintaining in said images the same centers.

In the drawings Figure 1 is a central vertical longitudinal section through the lens mount showing the lens set for infinity. Fig. 2 is the same as Fig. 1 with the lens adjusted for close up work. Fig. 3 is a front elevation of the lens mount shown in Fig. 1. Fig. 4 is a section on the line 4—4 of Fig. 2. Fig. 5 is a left hand end view of Fig. 2 with slides therein. Fig. 6 is a vertical section through Fig. 5. Fig. 7 is a vertical section on the line 7—7 of Fig. 2.

There is shown in the drawings herein a casing 10, which forms a part of the camera or projecting machine, and has an opening 11 for the lens mount. The barrel 12, for mounting the lenses, extends through the opening 11 and is of smaller size and diameter than said opening so that it can be adjusted in position in said opening for the purpose hereinafter stated. Said barrel is secured or mounted in a slide plate 13 by being screwed therein, and said slide plate lies against the face of the casing and overlaps the opening 11 therethrough, and is adjustable thereon by the screw 14, which operates through a threaded opening in the bracket 15 secured to the casing and is headed in the bracket 16 secured to the plate 13. This enables said plate to be adjusted to bring the lens mounting into the proper position in the opening 11 of the casing.

The barrel at its rear end is formed so as to provide two equal apertures 17 of the same form, shape and size as the outline of the picture. There is a horizontal partition plate 18 which divides the rear end of the barrel and said aperture into equal halves, to keep separate the rays of light for forming the two pictures or images in the camera, or projecting the two images from a projecting machine. The rear end of the barrel is provided with an inwardly projecting annular plate 18 and spaces from the end plate so as to form an annular recess 20, which is in alinement with a slot 21 in the partition 18 for receiving the slides or masks 22 for predetermining the size and shape of the apertures for any desired purpose familiar to those skilled in the art.

Within the barrel 12 there is a sleeve 22, which is longitudinally movable in the barrel, and in which sleeve and parts associated therewith the lenses are mounted, and by which they are adjusted in position. This sleeve 22 is reciprocated while being adjusted by means of a rack 23 thereon, engaged by a pinion 24 secured on the finger shaft 25 mounted in the pair of brackets 26, as shown in Figs. 1 and 3. The rearward movement of said sleeve is limited by a shoulder 28 in the barrel and said sleeve is insertible in the front end of the barrel.

The rear end of the sleeve 22 is internally threaded to receive a lens cell 30 for mounting the rear lens 31. The edge of said lens is secured between said cell 30 and an annular rib 32, as seen in Fig. 1. The middle of the lens abuts against a pair of guide plates 33, which are secured to and carry the cell 30, extending across the same diametrically and spaced to receive the front edge or portion of the partition plate 18 and thus supplement and maintain said partition during the adjustment of the lens, as indicated for example in Figs. 1 and 2. In Fig. 2 the sleeve carrying the lens 31 has been moved to the right some distance and the guide plates 33 coöperate with the partition 18 to maintain and preserve a partition in the rear portion of the barrel.

There is a pair of intermediate smaller lenses 35 which have metal rims 36 mounted and secured in lens holding slide plates 37, see Fig. 4, which are vertically slidable in and between the partition guide plates 38. The adjacent ends of the metal rims 36 of these two lenses are secured to the rear free ends of the double spring partition 40, which has a double plate made of spring metal, with the two free ends secured on the rod 41 that extends diametrically of the sleeve 22. The spring plates are preferably bent in the middle around said rod 41, and their free edges are crimped to form recesses for receiving the lens cell where the spring plates 40 engage said lens cells tangentially, as shown in Fig. 4. On the outer edge of each lens cell 36 there is secured an arm 141, see Fig. 1, which has a triangular head projecting through the slots 42 in the sleeve 22 and the slots 43 in the barrel 12. The two slots in the sleeve and barrel register with each other when the parts are in the position shown in Fig. 1, so that the triangular heads on the arms 141 are permitted to project outwardly to the limit of their movement and thus hold the intermediate lens cells carrying lenses 35 at some distance from each other, as shown in Fig. 1. When, however, the sleeve is moved longitudinally from the position shown in Fig. 1 to that shown in Fig. 2, the inclined surfaces of the barrel at the slots 42, by engagement of the inclined surface of the heads of the arms 141, forces them inwardly and thus slide the mount or cell of the lens 35 so as to bring them closer together, and the movement of the lens cell 36 together also brings together the two spring plates 40. Therefore the partition plates 40 follow the intermediate lenses 35 in any position which they assume, and by changing the positions of the lens cells 36 results are obtained as will hereafter be explained. The lenses 35 may be adjusted to any intermediate position between the extreme position shown, as the nature of the work requires.

The forward end of the sleeve 22 is internally threaded to receive the cell or mount 45 for the front lens construction 46. Therefore the three sets of lenses are always maintained equal distance from each other.

When the parts of the lens mount are adjusted in the position shown in Fig. 1 with the lens cells in their rearwardmost position, and the intermediate lens cells in their outermost positions, radially speaking, the lenses therein are set for infinity, or for photographing distant objects. In a projecting machine this position or adjustment adapts the machine for a screen located relatively far from the machine. If the object being photographed is nearer the camera, or the screen near the projecting machine, the sleeve carrying the lenses is moved or adjusted to the right toward the position shown in Fig. 2. In other words by this adjustment the apparatus is enabled to properly focus, and the intermediate lenses are transversely moved into the proper position with relation to each other, and the other lenses to attain the proper focus. The vertical adjustment of the lens mount is to adapt it for the proper framing of the picture.

In order to adapt the apparatus for variances in the brilliancy in the light, the diaphragm construction shown at the front end of the front lens holder 45 is provided. In this construction the diaphragm members 50 and 51 are horizontal, straight and parallel with each other, and are not curved or circular. The two outermost diaphragms 50 are pivoted to opposite points on the front end of the lens holder 45, and the pair of intermediate diaphragms 51 are pivoted to the rod 52, which is at a point midway or diametric thereof in line with the spring partition plates 40, the guide plates 43 and the partition 18. The diaphragms 50 and 51 adjacent each other are inclined toward each other and move toward or from each other by a lateral threaded screw 53, which carries nuts 54 secured to said diaphragms, and by this means the space between each pair of diaphragms for the admission of light may be increased if the light is not bright, or diminished if the light is brilliant, according to the light conditions under which the device is being operated at the time.

It is thus seen there is herein provided an adjustable lens mount carrying suitable lens cells in combinations, and said lens mount is suitable as an attachment to a camera for taking photographs in duplication, or suitable as an attachment to a projecting apparatus for projecting a plurality of images upon a common field. There is means for separating the image in the lens barrel and automatically adjusting the plural combinations as the main lens mount is racked back and forth to reach the proper focus, and means for extending or elongating the separating partition which separates the rays of light in the barrel for forming or reproducing the images, and means for adjusting the aperture to coincide with the separated image on the plate or film, and a diaphragm construction to adapt the apparatus to the light conditions, which permits the light for the full width of the lens to pass and thus fully and accurately illuminate the images or pictures.

It is also noticeable that in this lens mount the plurality of passageways for the light are always uninterrupted.

It is seen, therefore, that the foregoing machine makes not only the focus of the lens correct in its position in relation to the subject being photographed, and to the plate, as in ordinary photography, but it also corrects by this single means or movement the focal center of the back combination of lenses in such a way that it makes no difference what position the subject may be in, the exact or common center of the resultant pictures are always maintained equidistant from one another.

The invention claimed is:

1. A lens mount for photographic and projecting apparatus, including a stationary lens, a plurality of transversely adjustable lenses, and means for simultaneously effecting the transverse adjustment of said plurality of lenses and the longitudinal adjustment of all the lenses.

2. A lens mount for photographic and projecting apparatus, including a stationary lens, a plurality of lenses mounted so as to be movable toward or away from each other, and a single means for effecting the transverse adjustment of said plurality of lenses and the longitudinal adjustment of all the lenses.

3. A lens mount for photographic and projecting apparatus including a plurality of lens cells, means in which said cells are mounted so that the cells are movable transversely toward and away from each other, a barrel in which said lens mounting is slidable, and means operated by the slidable movement of one of said members relative to the other for adjusting said plurality of lens cells so as to maintain the focal centers and the focal length of the lenses in said apparatus.

4. A lens mount for photographic and projecting apparatus including a plurality of lens cells movable toward and away from each other, longitudinally adjustable means in which said lens cells are mounted, and means movable by the longitudinal movement of said adjustable means for adjusting the position of said lens cells with reference to each other.

5. A less mount for photographic and projecting apparatus including a barrel, a sleeve longitudinally adjustable therein, a plurality of lens cells mounted in said sleeve so as to be movable toward and away from each other, and means moved by the adjustment of said sleeve for adjusting the position of said lens cells with reference to each other.

6. A lens mount for photographic and projecting apparatus including a barrel, a sleeve longitudinally adjustable therein, a plurality of lens cells mounted in said sleeve, one of said separate lens cells for each passageway for the light, radially slidable means for carrying each of said last mentioned lens cells, a spring plate partition connected with each of said lens cells so as to move therewith and form a perfect separation in all positions of said lens cells and the light passageways, and a partition plate in the rear end of the barrel which is in alinement with said spring partition plates.

7. A lens mount for photographic and projecting apparatus including a barrel, a sleeve longitudinally adjustable therein, a plurality of lens cells mounted in said sleeve, one of said separate lens cells for each passageway for the light, radially slidable means for carrying each of said last mentioned lens cells, a spring plate partition connected with each of said lens cells so as to move therewith and form a perfect separation in all positions of said lens cells and the light passageways, a partition plate in the rear end of the barrel which is in alinement with said spring partition plate, and a partition plate secured to the sleeve which is adjacent the rear end and overlaps the partition plate secured to the barrel so as to elongate said partition as the sleeve is adjusted.

8. A lens mount for photographic and projecting apparatus including a barrel, a sleeve longitudinally adjustable therein, a plurality of lens cells mounted in said sleeve, one of said separate lens cells for each passageway for the light, radially slidable means for carrying each of said last mentioned lens cells, a pair of partition plates diametric in said sleeve and with their free ends secured to said separate lens cells, and means connected with the sleeve for pivotally mounting the free ends of said plates.

9. A lens mount for photographic and projecting apparatus including a barrel, a sleeve longitudinally adjustable therein, a plurality of lens cells mounted in said sleeve, one of said separate lens cells for each passageway for the light, radially slidable means for carrying each of said last mentioned lens cells, a spring plate partition connected with each of said lens cells so as to move therewith and form a perfect separation in all positions of said lens cells and the light passageways, and means connected with said separate lens holders for causing them to be radially moved automatically in accordance with the adjustment of said sleeve.

10. A lens mount for photographic and projecting apparatus including a barrel, a sleeve longitudinally adjustable therein, a plurality of lens cells mounted in said sleeve, one of said separate lens cells for each passageway for the light, radially slidable means for carrying each of said last mentioned lens cells, a spring plate partition connected with each of said lens cells so as to move therewith and form a perfect separation in all positions of said lens cells, and means connected with said separate lens cells which are in engagement with the barrel and are forced inwardly by the barrel as the sleeve is adjusted in one direction, said separate lens cells being forced radially apart by the spring partitions when the sleeve is adjusted in the opposite direction.

11. A lens mount for photographic and projecting apparatus including a barrel, a sleeve longitudinally adjustable therein, a plural combination of lenses mounted in said sleeve, one of said combination of lenses having a separate lens for each passageway for the light, radially slidable means for holding each of said last mentioned lenses, a spring plate partition connected with each of said lens holding means so as to move therewith and form a perfect separation in all positions of said lenses, and an arm secured to the outer portion of each separate lens holding means having an inclined head projecting through a slot in said sleeve and a corresponding slot in said barrel whereby when the sleeve is in one position the head on said arm will project through the barrel and permit the spreading of said separate lenses and when the sleeve is moved in its other position the barrel will force the heads on said arms inwardly and thus move said separate lenses toward each other.

In witness whereof, I have hereunto affixed my signature.

WALTER W. BLACKMAN.